United States Patent [19]

Duvdevani et al.

[11] 4,151,137

[45] Apr. 24, 1979

[54] BLEND COMPOSITIONS

[75] Inventors: Ilan Duvdevani, Fort Lee, N.J.; Jan Bock, Houston, Tex.

[73] Assignee: Exxon Research & Engineering Co., Florham Park, N.J.

[21] Appl. No.: 855,728

[22] Filed: Nov. 29, 1977

[51] Int. Cl.$^2$ .............................................. C08L 91/00
[52] U.S. Cl. .......................... 260/23.5 A; 260/23.7 R; 260/28.5 B; 260/33.6 AQ; 260/42.43; 260/42.47; 260/DIG. 31
[58] Field of Search ............ 260/79.3 R, 23.7, 23.5 A, 260/33.6 AQ, 33.6 PQ, 28.5 B, 889, 42.43, 42.47, 878, 879, 31.2 R

[56] References Cited

U.S. PATENT DOCUMENTS

| | | | |
|---|---|---|---|
| 3,642,728 | 2/1972 | Canter | 260/896 |
| 3,847,854 | 11/1974 | Canter et al. | 260/32.6 PQ |
| 3,974,240 | 8/1976 | Bock et al. | 260/897 B |
| 3,974,241 | 8/1976 | Lundberg et al. | 260/897 B |

*Primary Examiner*—Lewis T. Jacobs

*Attorney, Agent, or Firm*—Richard E. Nanfeldt

[57] ABSTRACT

This invention relates to injection moldable and extrusion type elastomeric compositions having a viscosity at 200° C. at 0.73 sec$^{-1}$ of less than about $8 \times 10^5$ poises. The compositions used for elastomeric articles include 100 parts of a neutralized sulfonated EPDM terpolymer; less than about 200 parts per hundred of a paraffinic, low polarity process oil; about 25 to about 200 parts per hundred of an amorphous silica filler treated or untreated; and a preferential plasticizer at about less than 50 parts per hundred based on 100 parts of the sulfonated elastomeric polymer. The composition may also include a crystalline polyolefinic thermoplastic at less than about 100 parts per hundred by weight per 100 parts of sulfonated polymer.

These blend compositions can be readily processed due to their superior rheological properties on conventional plastic fabrication equipment, especially on low and high pressure injection molding or extrusion equipment into elastomeric articles having excellent physical properties and desirable rubbery characteristics.

23 Claims, No Drawings

BLEND COMPOSITIONS

BACKGROUND OF THE INVENTION

1. Field of the Invention

This invention relates to injection moldable and extrusion type elastomeric compositions having a viscosity at 200° C. at 0.73 sec$^{-1}$ of less than about $8 \times 10^5$ poises. The compositions used for elastomeric articles include 100 parts of a neutralized sulfonated EPDM terpolymer; about less than 200 parts per hundred of a paraffinic, low polarity process oil; about 25 to about 200 parts per hundred of an amorphous silica filler; and a preferential plasticizer at about less than 50 parts per hundred based on 100 parts of the sulfonated elastomeric polymer. The composition may also include a crystalline polyolefinic thermoplastic at less than about 100 parts per hundred by weight per 100 parts of sulfonated polymer.

These blend compositions can be readily processed due to their superior rheological properties on conventional plastic fabrication equipment, especially on low and high pressure injection molding or extrusion equipment into elastomeric articles having excellent physical properties and desirable rubbery characteristics.

2. Description of the Prior Art

Recently a new class of thermoelastic sulfonated polymers has been described in a number of U.S. patents. These sulfonated polymers are derived from polymeric materials having olefinic unsaturation, especially elastomeric polymers such as Butyl and EPDM rubbers. U.S. Pat. No. 3,642,728, herein incorporated by reference, clearly teaches a method of selective sulfonation of olefinic unsaturation sites of an elastomeric polymer to form an acid form of a sulfonated elastomeric polymer. The olefinic sites of the elastomeric polymer are sulfonated by means of a complex of a sulfur trioxide donor and a Lewis base. The SO$_3$H groups of the sulfonated elastomer can be readily neutralized with a basic material to form an ionically crosslinked elastomer having substantially improved physical properties over an unsulfonated elastomer at room temperature. However, these ionically crosslinked elastomers may be processed like a conventional thermoplastic at elevated temperatures under a shear force in the presence of selected preferential plasticizers which dissipate the ionic associations of the elevated temperatures thereby creating a reprocessable elastomer.

The basic materials used as neutralizing agents are selected from organic amines or basic materials selected from Groups I, II, III, IV, V, VIB, VIIB and VIII and mixtures thereof of the Periodic Table of Elements. Although these sulfonated elastomeric polymers prepared by the process of this patent are readily usable in a certain number of limited applications, they are not as readily adaptable for the manufacture of an injection moldable elastomeric article such as footwear or extrusion articles such as garden hose as are the improved compositions of the present invention, wherein both improved physical and rheological properties are realized.

U.S. Pat. No. 3,836,511, herein incorporated by reference, teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the acid form of the sulfonated elastomeric polymers are organic amines. The resultant ionically crosslinked sulfonated elastomers prepared by this process do not exhibit both the improved physical and rheological properties of the compositions of the present invention.

U.S. Pat. No. 3,870,841, herein incorporated by reference, teaches a method of plasticization of the polymeric backbone of a neutralized sulfonated plastic polymer by means of a polymer chain plasticizer which is a liquid compound having a boiling point of at least about 120° F. The polymer chain plasticizer is selected from a dialkyl phthalate, a process oil or an organic acid ester. Additionally, a domain plasticizer can be incorporated into the composition, wherein the domain plasticizer reversibly disrupts the association of the sulfonate groups at a temperature of forming. The compositions formed by this process are not as suitable for the manufacture of high performance elastomeric articles such as footwear formed by an injection molding process or garden hose by an extrusion process as are the compositions of the present invention.

U.S. Pat. No. 3,847,854, herein incorporated by reference, teaches a method of improving the processability of neutralized sulfonated elastomeric polymers by the addition of a preferential plasticizer which has at least one functional constituent which exhibits a bond moment whose absolute value is at least 0.6 Debye, and must be a liquid at the desired processing temperature of the neutralized sulfonated elastomeric polymer. Again, the compositions of the present invention are more adaptable for use in the manufacture of high performance elastomeric articles.

Products resulting from the aforementioned methods for obtaining neutralized sulfonated elastomeric compositions possess either unsuitable rheological or physical properties for the applications envisioned in the present invention.

For example, the balance of physical and rheological properties of these resultant sulfonated elastomeric products of these aforementioned patents are unsuitable for major applications of injection molding or extrusion processes, for example the manufacture of footwear or garden hose, wherein excellent resilience, dimensional stability, excellent low and high temperature flexibility, excellent flex fatigue, and excellent abrasion are needed. Furthermore, the high melt viscosity and melt elasticity of these materials makes injection molding and extrusion difficult if not impossible. These materials of the aforementioned patents which are generally processable by only compression molding have unsuitable physical properties for such major applications as footwear and garden hose.

The materials cost of the compositions of the instant invention is substantially reduced over those of the aforementioned patents, wherein these previous patents failed to realize the criticality of the proper selection of the chemical and physical uniqueness of the basic elastomeric backbone, the degree of sulfonation, the proper selection of neutralizing agent in conjunction with plasticization, and the ability to extend these sulfonated polymers with oils and fillers. Unsulfonated elastomers, when extended with oils and fillers, show a general deterioration in physical properties. Quite surprisingly, through the proper selection of oil and a specific type of filler within a critical ratio of filler to oil, the sulfonated elastomeric compositions of the present invention show a marked improvement in both rheological and physical properties.

U.S. Pat. Nos. 3,974,240 and 3,974,241 filed on Nov. 18, 1974, describe the blending of a crystalline polyolefinic material with a neutralized sulfonated elastomeric polymer in an attempt to improve both the rheological and physical properties of the elastomeric polymer. The selection of the use of the crystalline polyolefinic material to improve both the stiffness as well as improving the melt viscosity of the composition was based in part upon the limitation of the use of fillers such as carbon black, clays, calcium carbonate or silicates as a single additive to the elastomeric polymer. Although fillers in combination with an elastomeric polymer increase the hardness of the composition, these fillers deteriorate the melt viscosity of the resultant composition. These materials are more adaptable for stiff elastomeric articles such as rubberized chair tips or wheels whereas the compositions of the present invention are more adapted for flexible elastomeric articles such as elastomeric footwear.

The unique and novel improved compositions of the present invention overcome the deficiencies of the aforementioned U.S. patents and applications from both a rheological and physical aspect. The blend compositions of the present invention solve the problem of having a material which has both desirable rheological and physical properties for the manufacture of an elastomeric article as an elastomeric footwear or garden hose, wherein the extrudate of the resultant compositions do not exhibit melt fracture during extrusion processing as in the case in some of the aforementioned patents. Additionally the improved compositions of the instant invention provide systems having improved adhesion and surface shine.

SUMMARY OF THE INVENTION

It has been found surprisingly that compositions formed from blends of neutralized sulfonated elastomeric materials, in particular a select class of neutralized sulfonated elastomeric polymers, an amorphous silica having a limited particle size range, filler, a non-polar process oil and a preferential plasticizer have suitable rheological and physical properties for the formation of an elastomeric article, namely a footwear by a low pressure injection molding process or garden hose by an extrusion process.

Accordingly, it is an object of our present invention to provide unique and novel compositions of matter for producing a high performance elastomeric article by a low or high pressure injection molding or extrusion process, wherein the compositions of the elastomeric article have a viscosity of 0.73 sec$^{-1}$ at 200° C. of less than about $8 \times 10^5$ poise, and a Shore A Hardness of about 30 to about 95 and less than about 12% aqueous volume swell after long exposure in 50° C. water.

It is an object of the instant invention to describe a class of compounds based on sulfonated ethylene-propylene terpolymers which can be processed on plastics type extrusion or injection molding equipment at high rates and which possess improved physical characteristics such as aqueous volume swell adhesion and tensile properties. One of the essential aspects of the present invention comprises the discovery that only a restricted class of the subject sulfonated elastomers may be readily employed for low pressure injection molding or extrusion fabrication. The restrictions are primarily associated with processing and product performance characteristics. These characteristics are to a degree modulated by the type and concentration of various compound ingredients. The compositions of the instant invention will, therefore, involve a class of compositions based on a restrictive class of sulfonated elastomers.

A substantial segment of the plastics and rubber fabrication industry employs a fabrication technique known as low pressure injection molding to form articles which can be classified as injection molded articles. An application employing this fabrication technique is elastomeric footwear which requires materials which are flexible and tough. Two broad classifications of materials which have been used are vulcanized elastomers and plasticized thermoplastics such as polyvinyl chloride (PVC). The fabrication of injection molded articles based on vulcanized elastomers is a major item of cost involving the vulcanization procedure. Not only is this step costly from an energy intensive viewpoint, but it is time consuming. The use of plasticating injection molding equipment for thermoplastic materials is more economical and results in high production rates for materials such as plasticized PVC. While these materials possess a degree of flexibility, they do not have a good rubbery feel or good low temperature flexibility. It is, therefore, desirable to have materials which can be processed on plastics type injection molding equipment at conventional plastics rates and which possess the flexibility and subjective rubbery characteristics of vulcanized elastomer.

GENERAL DESCRIPTION

This present invention relates to unique and novel blend compositions of a neutralized sulfonated elastomeric polymer, an amorphous silica filler having a specific range of particle size, and a non-polar process oil, wherein the resultant composition has a viscosity at 0.73 sec$^{-1}$ at 200° C. of less than about $8 \times 10^5$ poises, wherein the compositions are readily processable in a conventional injection molding process into a high performance elastomeric article such as footwear or garden hose. The resultant elastomeric article has excellent low and elevated temperature flexibility, excellent abrasion resistance, excellent flex fatigue, superior dimensional stability, good resilience, adhesive, surface shine, excellent aqueous volume swell properties and a rubber-like feel, and a Shore A Hardness of about 30 to about 95.

Various critically selected additives can be incorporated into the blend compositions such as a polyolefin thermoplastic for further modification of hardness as well as rheological properties, pigment, a lubricant for improvement of the physical appearance such as shine of the finished elastomeric article as well as the ability to easily eject the formed article from the mold during an injection molding process.

The neutralized sulfonated elastomeric polymer of this present instant invention are derived from unsaturated polymers which include low unsaturated elastomeric polymers such as Butyl rubber, or EPDM terpolymers.

Alternatively, other unsaturated polymers are selected from the group consisting essentially of partially hydrogenated polyisoprenes, partially hydrogenated polybutadienes, Neoprene, styrene-butadiene copolymers of isoprene-styrene random copolymers.

The expression "Butyl rubber" as employed in the specification and claims is intended to include copolymers made from a polymerization reaction mixture having therein from 70 to 99.5% by weight of an isoolefin which has about 4 to 7 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin.

Butyl rubber generally has a Staudinger molecular weight of about 20,000 to about 500,000, preferably about 25,000 to about 400,000, especially about 100,000 to about 400,000, and a Wijs Iodine No. of about 0.5 to 50, preferably 1 to 15. The preparation of Butyl rubber is described in U.S. Pat. No. 2,356,128 which is incorporated herein by reference.

For the purposes of this invention, the Butyl rubber may have incorporated therein from about 0.2 to 10% of combined multiolefin; preferably about 0.5 to about 6%; more preferably about 1 to about 4%, e.g. 2%.

Illustrative of such a Butyl rubber is Exxon Butyl 365 (Exxon Chemical Co.), having a mole percent unsaturation of about 2.0% and a Mooney viscosity (ML, 1+3, 212° F.) of about 40-50.

Low molecular weight Butyl rubbers, i.e. Butyl rubbers having a viscosity average molecular weight of about 5,000 to 85,000 and a mole percent unsaturation of about 1 to about 5% may be sulfonated to produce the polymers useful in this invention. Preferably, these polymers have a viscosity average molecular weight of about 25,000 to about 60,000.

The EPDM terpolymers are low unsaturated polymers having about 1 to about 10.0 wt. % olefinic unsaturation, more preferably about 2 to about 8, most preferably about 3 to 7 defined according to the definition as found in ASTM-D 1418-64 and is intended to mean terpolymers containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incorporated herein by reference. The preferred polymers contain about 40 to about 80 wt.% ethylene and about 1 to about 10 wt. % of a diene monomer, the balance of the polymer being propylene. Preferably, the polymer contains about 50 to about 70 wt. % ethylene, e.g. 50 wt. % and about 2.6 to about 8.0 wt. % diene monomer, e.g. 5.0 wt. %. The diene monomer is preferably a nonconjugated diene.

Illustrative of these nonconjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene, and methyl tetrahydroindene.

A typical EPDM is Vistalone 2504 (Exxon Chemical Co.), a terpolymer having a Mooney viscosity (ML, 1+8, 212° F.) of about 40 and having an ethylene content of about 50 wt. % and a 5-ethylidene-2-norbornene content of about 50 wt. %. The $\overline{M}n$ of Vistalon 2504 is about 100,000 by GPC measurement, the $\overline{M}v$ is about 310,000 by GPC and the $\overline{M}w$ is about 360,000 by GPC.

Another EPDM terpolymer Vistalon 2504-20 is derrived from V-2504 (Exxon Chemical Co.) by a controlled extrusion process, wherein the resultant Mooney viscosity at 212° F. is about 20. The $\overline{M}n$ of Vistalon 2504-20 is about 90,000 by GPC, the $\overline{M}v$ is about 230,000 by GPC and the $\overline{M}w$ is about 250,000 by GPC.

Nordel 1320 (DuPont) is another terpolymer having a Mooney viscosity of 212° F. of about 25 and having about 53 wt. % of ethylene, about 3.5 wt. % of 1,4-hexadiene, and about 43.5 wt. % of propylene.

The EPDM terpolymers of this invention have a number average molecular weight ($\overline{M}n$) of about 10,000 to about 200,000, more preferably of about 15,000 to about 100,000. The Mooney viscosity (ML, 1+8, 212° F.) of the EPDM terpolymer is about 5 to about 70, more preferably about 5 to about 60, most preferably about 5 to about 40. The $\overline{M}v$ of the EPDM terpolymer is preferably below about 400,000 and more preferably below about 300,000. The $\overline{M}w$ of the EPDM terpolymer is preferably below about 500,000 and more preferably below about 350,000.

In carrying out the invention, the elastomeric polymer is dissolved in a non-reactive solvent such as a chlorinated aliphatic hydrocarbon, chlorinated aromatic hydrocarbon, an aromatic hydrocarbon, or an aliphatic hydrocarbon such as carbon tetrachloride, dichloroethane, chlorobenzene, benzene, toluene, xylene, cyclohexane, pentane, isopentane, hexane, isohexane or heptane. The preferred solvents are the lower boiling aliphatic hydrocarbons. A sulfonating agent is added to the solution of the elastomeric polymer and non-reactive solvent at a temperature of about −100° C. to about 100° C. for a period of time of about 1 to about 60 minutes, most preferably at room temperature for about 5 to about 45 minutes; and most preferably about 10 to about 30. Typical sulfonating agents are described in U.S. Pat. Nos. 3,642,728 and 3,836,511, previously incorporated herein by reference. These sulfonating agents are selected from an acyl sulfate, a mixture of sulfuric acid and an acid anhydride or a complex of a sulfur trioxide donor and a Lewis base containing oxygen, sulfur, or phosphorous. Typical sulfur trioxide donors are SO$_3$, chlorosulfonic acid, fluorosulfonic acid, sulfuric acid, oleum, etc. Typical Lewis bases are: dioxane, tetrahydrofuran, tetrahydrothiophenol or triethylphosphate. The most preferred sulfonation agent for this invention is an acyl sulfate selected from the group consisting essentially of benzoyl, acetyl, propionyl or butyryl sulfate. The acyl sulfate can be formed in situ in the reaction medium or pregenerated before its addition to the reaction medium in a chlorinated aliphatic or aromatic hydrocarbon.

It should be pointed out that neither the sulfonating agent nor the manner of sulfonation is critical, provided that the sulfonating method does not degrade the polymer backbone. The reaction is quenched with an aliphatic alcohol such as methanol, ethanol, isopropanol, with an aromatic hydroxyl compound, such as phenol, a cycloaliphatic alcohol such as a cyclohexanol or with water. The acid form of the sulfonated elastomeric polymer has about 5 to about 100 meq. SO$_3$H groups per 100 grams of sulfonated polymer, more preferably about 10 to about 50, and most preferably about 15 to about 40. The meq. of SO$_3$H/100 grams of polymer is determined by both tritration of the polymeric sulfonic acid and Dietert Sulfur analysis. In the titration of the sulfonic acid, the polymer is dissolved in solvent consisting of 95 parts of toluene and 5 parts of methanol at a concentration level of 50 grams per liter of solvent. The acid form is titrated with ethanolic sodium hydroxide to an Alizarin Thymolphthalein endpoint.

The acid form of the sulfonated polymer is gel-free and hydrolytically stable. Gel is measured by stirring a given weight of polymer in a solvent comprised of 95 toluene-5-methanol at a concentration of 5 wt. % for 24 hours, allowing the mixture to settle, withdrawing a weighed sample of the supernatant solution and evaporating to dryness.

Hydrolytically stable means that the acid function, in this case the sulfonic acid, will not be eliminated neutral or slightly conditions to a neutral moiety which is incapable of being converted to highly ionic functionality.

Neutralization of the acid form of the sulfonated elastomeric polymer is done by the addition of a solution of a basic salt to the acid form of the sulfonated elastomeric polymer dissolved in the mixture of the aliphatic alcohol and non-reactive solvent. The basic salt is dissolved in a binary solvent system consisting of water and/or an aliphatic alcohol. The counterion of the basic salt is selected from antimony, aluminum, lead or Groups IA, IIA, IB or IIB of the Periodic Table of Elements and mixtures thereof. The anion of the basic salt is selected from a carboxylic acid having from about 1 to about 4 carbon atoms, a hydroxide or alkoxide and mixtures thereof. The preferred neutralizing agent is a metal acetate, more preferably zinc acetate. Sufficient metal salt of the carboxylic acid is added to the solution of the acid form of the elastomeric polymer to effect neutralization. It is preferable to neutralize at least 95% of the acid groups, more preferably about 98%, most preferably 100%.

Examples of metal oxides useful in preparing metal sulfonates are MgO, CaO, BaO, ZnO, $Ag_2O$, $PbO_2$ and $Pb_3O_4$. Useful examples of metal hydroxides are NaOH, KOH, LiOH, $Mg(OH)_2$ and $Ba(OH)_2$. The resultant neutralized sulfonated terpolymer has a viscosity at 0.73 $sec^{-1}$ at 200° C., less than about $8\times10^6$ poises, more preferably of less than about $5\times10^6$ poises and most preferably less than $3\times10^6$ poises.

A means of characterizing the apparent molecular weight of a polymer involves the use of melt rheological measurements. For ionic polymers, this is the preferred method since solution techniques are difficult to interpret due to the complex nature of the ionic associations. Melt rheological measurements of apparent viscosity at a controlled temperature and shear rate can be used as a measure of apparent molecular weight of an ionic polymer. Although the exact relationship between melt viscosity and apparent molecular weight for these ionic systems is not known, for the purposes of this invention the relationship will be assumed to be one of direct proportionality. Thus, in comparing two materials, the one with the higher melt viscosity will be associated with the higher apparent molecular weight (which includes the degree of ionic association).

The melt viscosity of the systems investigated were determined by the use of an Instron Capillary Rheometer. Generally, the melt viscosity measurements were made at a temperature of 200° C. and at various shear rates corresponding to crosshead speeds from 0.005 in/min to 20 in/min and a capillary die of about 0.05 in. diameter. The apparent viscosity at 200° C. and at a shear rate of 0.73 $sec^{-1}$ (0.005 in/min) is employed as a characterization parameter in this invention. A measure of the melt elasticity of a given system can also be obtained from these rheological measurements. A type of flow instability known as melt fracture is exhibited by many polymeric materials of high molecular weight. This phenomenon is shear sensitive and thus will generally exhibit itself at a given shear rate and temperature. The shear rate for the onset of melt fracture indicates the upper shear rate for processing a given material. This is used as a characterization parameter for compounds employed in extrusion processing.

The metal sulfonate containing polymers at the higher sulfonate levels possess extremely high melt viscosities and are thereby difficult to process. The addition of ionic group plasticizers markedly reduces melt viscosity and frequently enhances physical properties.

To the neutralized sulfonated elastomeric polymer is added, in either solution or to the crumb of the neutralized sulfonated elastomeric polymer, a preferential plasticizer selected from the group consisting essentially of carboxylic acid having about 5 to about 30 carbon atoms, more preferably about 8 to about 22 carbon atoms, or basic salts of these carboxylic acids wherein the metal ion of the basic salt is selected from the group consisting essentially of aluminum, iron, antimony, lead or Groups IA, IIA, IB or IIB of the Periodic Table of Elements and mixtures thereof. The carboxylic acids are selected from the group consisting essentially of lauric, myristic, palmitic or stearic acids and mixtures thereof; e.g. zinc stearate, magnesium stearate, or zinc laurate.

The preferential plasticizer is incorporated into the neutralized sulfonated elastomeric polymer at about 0 to about 60 parts per hundred by weight based on 100 parts of the sulfonated polymer, more preferably at about 3 to about 40, and most preferably at about 5 to about 25. The metallic salt of the fatty acid can also be used as neutralizing agent. In the case of the neutralizing agent and plasticizer being the identical chemical species, additional metallic salt is added over the required levels of neutralization. Alternatively, other preferential plasticizers are selected from organic esters, phenols, trialkyl phosphates, alcohols, amines, amides, ammonium and amine salts of carboxylic acids and mixtures thereof. The preferred plasticizers are selected from fatty acid or metallic salts of fatty acid and mixtures thereof. The resultant neutralized sulfonated elastomeric polymer with preferential plasticizer is isolated from the solution by conventional steam stripping and filtration. The preferential plasticizer can also be added in a later compounding operation.

The resultant neutralized and plasticized sulfonated elastomer has a viscosity at 200° C. and a shear rate of 0.73 $sec^{-1}$ of less than about $5\times10^6$ poises, more preferably less than about $8\times10^5$ poises and most preferably less than about $5\times10^5$ poises.

The neutralized sulfonated elastomeric polymer is blended with the amorphous silica filler having a specific particle size range and a non-polar backbone process oil by techniques well known in the art. For example, the blend composition can be compounded on a two-roll mill. Other methods known in the art which are suitable for making these compositions include those methods employed in the plastic and elastomer industries for mixing polymer systems. An excellent polymer blend composition of this invention can be obtained through the use of a high shear batch intensive mixer called the Banbury. Alternatively, economic advantages in term of time and labor savings can be obtained through the use of a Farrel Continuous Mixer, a twin screw extruder, or tandem extrusion techniques which are continuous mixing types of equipment. The Banbury mixing device is the preferred batch type mixer, and the twin screw extruder or FCM is the preferred continuous mixer.

The amorphous silica fillers employed in the present invention are restricted to a selected range of particle size which is about less than about 2 microns, more preferably less than about 1.75 microns. The filler can be treated or untreated. These amorphous silica fillers are incorporated into the blend composition at about 25 to about 200 parts per hundred, more preferably at about 30 to about 180 and most preferably at about 60 to about 160. The oil absorption as measured by grams of oil absorbed by 100 grams of these amorphous silica fillers are about 10 to about 100 and most preferably more than about 20. Typical amorphous silica fillers employed in this invention are illustrated in Table I.

TABLE I

| Amorphous Silica Filler | Particle Size (Microns) | Gardner-Coleman Oil Absorption |
|---|---|---|
| Imsil A-108 (Illinois Mineral Co.) | about 1.1 avg. (90% less than 5) | 30 |
| Imsil A-10 | 1.55 microns | 30 |

The oils employed in the present invention are non-polar process oils having less than about 2 wt. % polar type compounds as measured by molecular type clay gel analysis. These oils are selected from paraffinics ASTM Type 104B as defined in ASTM-D-2226-70, aromatics ASTM Type 102 or naphthenics ASTM Type 104A, wherein the oil has a flash point by the Cleveland open cup of at least 350° F., a pour point of less than 40° F., a viscosity of about 70 to about 3000 ssu's at 100° F. and a number average molecular weight of about 300 to about 1000, and more preferably about 300 to 750. The preferred process oils are paraffinics. Table II illustrates typical oils encompassed by the scope of this invention.

The oils are incorporated into the blend composition at a concentration level of about 20 to about 200 parts per hundred, more preferably at about 20 to about 190, and most preferably at about 25 to about 180.

TABLE II

| Type Oil | Oil Code # | Viscosity ssu | Mn | % Polars | % Aromatic | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |
| Paraffinic | Tufflo 6056 | 495 | — | 0.0 | 0.9 | 99.1 |
| Naphthenic | Tufflo 6054 | 580 | — | 0.0 | 8.0 | 92.0 |

The amorphous silica filler to oil ratio in the present instant application is critical and should be about 0.2 to about 4, more preferably 0.5 to about 3.0 and most preferably about 0.75 to about 2.5.

Various other additives can be incorporated into the blend compositions to improve the physical properties, the appearance, the chemical properties of the formed elastomeric article or to modify the processability of the blend compositions.

A crystalline polyolefinic thermoplastic can be incorporated into the blend composition in minor proportions as a means for modification of the rheological properties of the blend compositions as well as the mechanical properties such as stiffness, tensile and tear of the elastomeric article. It also improves the dimensional stability of a molded product after molding. Typically, the crystalline polyolefinic thermoplastic is added to the blend composition at a concentration level of about 0 to about 100 parts per hundred by weight based on 100 parts of sulfonated polymer, more preferably at about 0 to about 90; and most preferably at about 0 to about 70.

The crystalline polyolefin is characterized as a polymer of an alpha-olefin having a molecular weight of at least 2,000, preferably at least 10,000, and more preferably at least 20,000. This material comprises substantially an olefin but may incorporate other monomers, for example, vinyl acetate, acrylic acid, methyl acrylate, ethyl acrylate, methacrylic acid, sodium methacrylate, etc. The preferred polyolefins are selected from the group consisting of polymers of $C_2$ to $C_4$ alpha-olefins. Most preferably, the polyolefins are selected from the group consisting of polyethylene, polybutene, polypropylene, and ethylene-propylene copolymers. It is critical that the crystalline polyolefin have a degree of crystallinity of at least 25% and most preferably at least 40%.

Both high and low density polyethylene are within the scope of the instant invention. For example, polyethylenes having a density from 0.90 to 0.97 gms/cc are generally included. Polypropylene polymers having intermediate and high densities are the preferred examples of the polypropylene materials useful in the instant invention. These materials will have a density from 0.88 to 0.925 gms/cc. The polyethylene or polypropylene can also be combined as copolymers thereof so long as adequate crystallinity is obtained in said combination. Thus, block copolymers wherein polyethylene or polypropylene is present in crystalline form are effective.

Zinc oxide can be incorporated into the blend as a whitening pigment as well as a means for improving the ionic bonding force between the sulfonate groups in the sulfonated elastomeric polymer. The zinc oxide is incorporated into the blend composition at a concentration level of about 0 to about 25 parts per hundred by weight based on 100 parts of sulfonated polymer, more preferably about 0 to about 15. Alternatively, a Rutile or Anatase titanium dioxide can be employed as a whitening pigment.

A metallic hydroxide can be incorporated into the blend composition as a means of further neutralizing any residual free acid in the elastomeric compositions. The metallic hydroxide is incorporated at a concentration level of about less than 50 parts per hundred based on 100 parts of the neutralized sulfonated elastomeric polymer, wherein the metal ion of the metallic hydroxide is selected from Group IIA of the Periodic Table of Elements such as barium, calcium or magnesium.

A lubricant can be employed in the blend composition at a concentration level of about 0 to about 20 parts per hundred based on 100 parts of the neutralized sulfonated elastomeric polymers, and more preferably about 0 to about 15. The lubricants of the present instant invention are non-polar paraffinic hydrocarbon waxes having a softening point of about 135° F. to about 220° F., more preferably 150° F. to 200° F., wherein the wax has a number average molecular weight of about 1000 to about 4000, more preferably 1500 to 3500, and less than about 2 wt. % polar constituents. These lubricants modify the rheological properties of the composition, improve the processability in forming the elastomeric article and impart a shine or gloss to the elastomeric article. Additionally, amorphous polypropylene can be used as a lubricant.

The ingredients incorporated into the blend compositions of the present invention, in conjunction with the type of elastomeric polymer, the degree of sulfonation, the metal counterion of the neutralized sulfonated elastomeric polymer, the specific amorphous silica filler and the plasticizer give materials processable by extrusion or injection molding processes into elastomeric articles having the desirable physical and rheological properties. These combined physical properties and rheological processability characteristics were not previously obtainable in the aforementioned U.S. patents and applications previously incorporated herein by reference.

DETAILED DESCRIPTION

The advantages of both the rheological and physical properties of the blend compositions of the present invention can be more readily appreciated by reference to the following examples and tables. Unless otherwise specified, all measurements are in parts per hundred by weight.

EXAMPLE 1

Zinc neutralized sulfonated EPDM terpolymers each having 30 meq. of $SO_3Zn$ groups were prepared according to the procedure of U.S. Pat. No. 3,836,511 wherein the $SO_3H$ groups were neutralized with zinc acetate. The two resultant zinc neutralized EPDM terpolymers are labelled Thionic 303 and Thionic 304, wherein Thionic 303 was formed from an EPDM terpolymer having a 56% ethylene content and a 20 Mooney and 304 was formed from an EPDM terpolymer having a 70% ethylene content and a 20 Mooney.

EXAMPLE 2

Compounds IIA and IIB as listed in Table III were compounded in a Banbury mixer to a temperature of about 160° C. for about 6–10 minutes until a homogeneous mixture has been achieved.

TABLE III

|  | IIA | IIB |
|---|---|---|
| Thionic 303 gum | 91 | 91 |
| ZnSt | 9 | 9 |
| Tufflo Oil 6056 | 78 | 78 |
| Calcium Carbonate | 83 | — |
| Clay | 60 | — |
| ZnO | 5 | 5 |
| L.D.P.E. | 20 | 20 |
| Red Oxide Pigment | 3.5 | 3.5 |
| Imsil A-108 | — | 143 |

The resultant compounds IIA and IIB were tested for both rheological and physical properties which are summarized in Table IV.

TABLE IV

| Compression Molded Properties | IIA | IIB |
|---|---|---|
| R.T. Tensile: |  |  |
| 100%, psi | 382 | 301 |
| At Break, psi | 891 | 1108 |
| Elong, % | 637 | 928 |
| R.T. Die C Tear, ppi | 197 | 194 |
| R.T. Secant Flex. Mod., psi | 2200 | 2500 |
| Water Immersion at 50° C. |  |  |
| for 1144 Hrs., % $H_2O$ | 10.8 | 3.9 |
| for 500 Hrs., % $H_2O$ | 12.4 | 7 |
| % $H_2O$ after 158 hours in |  |  |
| water at R.T. | 2.2 | 2.0 |
| After 500 hours | 3.9 | 3.3 |
| R.T. Comp. Set, %, dry | 43 | 46 |
| Wet (~1.54% $H_2O$) | 40 | 44 |

TABLE IV-continued

| Compression Molded Properties | IIA | IIB |
|---|---|---|
| M.I., 190° C. at 250 psi | 10 | 27 |
| 70° C. Tensile, psi | 360 | 365 |
| 70° C., Elong, % | 560 | 875 |
| 85° C. Tensile, psi | 170 | 140 |
| 85° C. Elong, % | 700 | 950 |
| 100° C. Tensile, psi | 57 | 11 |
| 100° C. Elong, % | 870 | 1200+ |
| After 150 Hrs. in the weatherometer: |  |  |
| R.T. Tensile, psi | 930 | 1090 |
| R.T. Elong, % | 370 | 720 |

The incorporation of the Imsil A-108 filler as seen in Compound IIB as compared to the calcium carbonate/clay extended compound IIA resulted in a significant increase in rheological properties by increasing the melt index from 10 to 27. Additionally, the hot flexural properties of compound IIB are significantly improved over IIA while maintaining similar hot tensile properties. Furthermore, the % elongation of sample IIB is approximately double that of sample IIA have exposure for 150 hours in a weatherometer. Compound IIB exhibits 3.9% water absorption after exposure for 144 hours at 50° C. as compared to the 10.8% water absorption for compound which is a significant improvement for water hose applications. Surface gloss was also improved in Compound IIB.

EXAMPLE 3

Compounds IIIA to IIID were made according to the procedure of Example 2 and injection molded samples were prepared for physical testing, wherein the results are summarized in Table V.

TABLE V*

|  | IIIA | IIIB | IIIC | IIID |
|---|---|---|---|---|
| Thionic 303 | 100 | 100 | 100 | 100 |
| ZnSt | 18 | 18 | 18 | 18 |
| Imsil A-108 (Ill. Mineral Co.) | 150 | 150 | 150 | 150 |
| Sunpar 180 (Sunoco) | 150 | 150 | — | 120 |
| Tufflo 6056 (ARCo) | — | — | 125 | — |
| LD 600, LDPE (Exxon) | — | 30 | 30 | — |
| CD 460, PP (Exxon) | — | — | — | 30 |
| $TiO_2$, Ti Pure R101 (DuPont) | — | — | 4 | 4 |
| Irganox 1010 (CIBA) | — | — | 0.4 | — |
| M.I., 190° C., 43 psi | 6.2 | — | 8.9 | 12.8 |
| Shore A | 47 | 57 | 61 | 63 |
| R.T. Tensile |  |  |  |  |
| 100%, psi | 180 | 240 | 310 | 365 |
| At Break, psi | 820 | 540 | 570 | 830 |
| Elong. % | 650 | 570 | 340 | 710 |
| R.T. Die C Tear, ppi | 110 | 150 | 150 | 195 |
| R.T. Comp. Set, % | 60 | 45 | 43 | 54 |

*Injection molded samples. Tensiles of type IV dumbbells at 20 in/min.

The physical test data of samples IIIA to IIID as illustrated in Table V clearly show that these compounds can be readily used in elastomeric footwear applications. Compound IIIA shows stress recovery after injection molding resulting in a distorted sample while the compounds incorporating polyethylene or polypropylene are distortion free.

All the compounds shown in this example showed excellent adhesion to leather or to themselves when a 2 component polyurethane adhesive system was used. Tear experiments resulted in tear propagation away from the bonded surface.

EXAMPLE 4

Compounds IVA to IVC were made by compounding the ingredients in a "B" Banbury for about 4–10 minutes to a temperature of about 160° C. until a homogeneous mixture had been realized. The samples were injected molded at 200° C. for samples IVA and IVB and at 221° C. for IVC. Compression molding of compounds IVA and IVB were done at 177° C. for 5 minutes. The physical and rheological properties of these injection and compression molded samples are summarized in Table VI.

The compounds tested in the above examples demonstrate inprovements realized with the preferred amorphous silica over other mineral fillers such as clay and calcium carbonate. While maintaining good resilience and mechanical properties such as tensile and tear the amorphous silica compounds exhibit reduced melt viscosity (better flow), improved adhesion, reduced aqueous uptake and superior surface shine after processing operations such as molding and extrusion.

In addition, from Example 3 it is clear that a crystalline polyolefin ingredient is desirable for an injection molding compound in order to avoid distortions due to relaxed molding stresses.

TABLE VI

|  | IVA | IVB | IVC |
|---|---|---|---|
| Thionic 303 | 100 | 100 | — |
| Thionic 304 | — | — | 100 |
| ZnSt (USP) | 10 | 18 | 13 |
| Imsil A 108, Amorph. Silica | 150 | 150 | — |
| Tufflo 6056 Oil | 85 | 125 | — |
| ZnO (Protox 166) | 6 | — | — |
| LD 600, LDPE | 25% 30 | — | — |
| CD 460, PP | — | — | 60 |
| TiO$_2$, Tipure R101 | — | 4 | — |
| Irganox 1010 | 0.35 | 0.4 | 0.2 |

|  | IVA | | IVB | | IVC |
|---|---|---|---|---|---|
| Properties | Inj. Molded | Comp. Molded | Inj. Molded | Comp. Molded | Inj. Molded |
| R.T. Shore A | 68 | 68 | 61 | 61 | 96 |
| R.T. Shore D (−/15 sec) | — | — | — | — | 46/40 |
| R.T. Tensile, psi |  |  |  |  |  |
| 100% | 727 | 344 | 314 | 266 | 2150 |
| Break | 842 | 1065 | 571 | 840 | 2980 |
| Elongation, % | 133 | 730 | 337 | 810 | 540 |
| Tensile Set, % | 3 | 44 | 14 | 47 | 212 |
| 70° C. Tensile (psi) |  |  |  |  |  |
| 100% | 407 | 196 | 194 | 148 | 1330 |
| Break 508 | 492 | 290 | 370 | 1790 |  |
| Elongation, % | 143 | 715 | 250 | 850 | 590 |
| R.T. Comp. Set, % | 35 | 41 | 43 | 48 | 55 |
| Flexural set, deg./5 min.+ | 5.5 | 2.5 | 7.0 | 2.0 | 23 |
| R.T. Die C Tear, ppi | 120 | 235 | 150 | 175 | 580 |
| R.T. Secant Flex, Mod., psi | 1690 | 1310 | 1480 | 1000 | 42900 |
| M.I., 190° C., 43 psi | 0.72 |  | 8.9 |  | — |
| M.I., 190° C., 250 psi | 29.3 |  | 247 |  | — |
| M.F.R., 230° C., 43 psi/250 psi | — |  | — |  | 0.6/17.6 |
| Density, g/cm$^3$ | 1.23 |  | 1.17 |  | 0.92 |

Tensiles measured on type IV dumbbells (Die C) at 20 in/min.
Injection molding temperature 200° C. for IVA and IVB and 221° C. for IVC.
All mixing done on a "B" Banbury.
IVA shrinks badly after injection molding.
+ According to a Chevrolet (GM Corp.) test No. CTZ-ZZ-003. Thickness of injection molded samples was 0.125 in. and compression molded samples was 0.070 in.

What is claimed is:

1. An elastomeric composition having a viscosity at 0.73 sec$^{-1}$ at 200° C. of less than about $8 \times 10^5$ poises, said composition injection moldable or extrudable into an elastomeric article, which comprises:
   (a) a neutralized sulfonated elastomeric polymer having about 5 to about 50 meq. neutralized sulfonate groups per 100 grams of said sulfonated elastomeric polymer;
   (b) about 20 to about 200 parts by weight of a nonpolar process oil per hundred parts of said neutralized sulfonated elastomeric polymer, said oil having less than about 2 wt. % polar constituents;
   (c) about 25 to about 200 parts by weight of an amorphous silica filler per hundred parts of said neutralized sulfonated elastomeric polymer, said amorphous silica filler having a particle size of less than about 2 microns treated or untreated, wherein a ratio of said amorphous silica filler to said oil is from about 0.2 to about 4; and
   (d) a preferential ionic plasticizer at about at least 5 parts per hundred parts of said neutralized sulfonated elastomeric polymer.

2. A composition according to claim 1, wherein said neutralized sulfonated elastomeric polymer is formed from an elastomeric polymer selected from the group consisting of Butyl rubber and an EPDM terpolymer.

3. A composition according to claim 1, wherein said sulfonate groups are neutralized with a counterion being selected from the group consisting of ammonium, antimony, aluminum, lead and Groups IA, IIA, IB and IIB of the Periodic Table of Elements and mixtures thereof.

4. A composition according to claim 2, wherein said EPDM terpolymer consists essentially of about 40 to about 80 wt. % of ethylene, of about 10 to about 59 wt. % of propylene and of about 1 to about 10 wt. % of a nonconjugated diene.

5. A composition according to claim 4, wherein said nonconjugated diene is selected from the group consisting of 1,4-hexadiene, dicyclopentadiene, alkylidene substituted norbornenes, alkenyl substituted norbornenes and tetrahydroindene.

6. A composition according to claim 5, wherein said nonconjugated diene is 5-ethylidene-2-norbornene.

7. A composition according to claim 1, having a Shore A Hardness of about 30 to about 95.

8. A composition according to claim 1, wherein said preferential plasticizer is at a concentration level of less than about 40 wt. % based on said neutralized sulfonated elastomeric polymer.

9. A composition according to claim 8, wherein said preferential plasticizer is selected from the group consisting of carboxylic acids and metallic salts of said carboxylic acids and mixtures thereof.

10. A composition according to claim 8, wherein said preferential plasticizer is a combination of stearic acid and a metallic salt of said stearic acid, a metal ion of said metallic salt being selected from the group consisting of lead, antimony, aluminum, and Groups IA, IIA, IB and IIB of the Periodic Table of Elements and mixtures thereof.

11. A composition according to claim 1, wherein said filler has an oil absorption of about 10 to about 100.

12. A composition according to claim 1, wherein said non-polar process oil is selected from the group consisting of paraffinic, naphthenic and aromatics and mixtures thereof.

13. A composition according to claim 1, wherein said non-polar process oil is paraffinic having an Mn of about 400 to about 1000.

14. A composition according to claim 1, further including a crytalline polyolefinic thermoplastic.

15. A composition according to claim 14, wherein said polyolefinic thermoplastic is added at a concentration level of less than about 100 parts by weight per hundred parts of said sulfonated polymer.

16. A composition according to claim 13, wherein said polyolefinic thermoplastic has an Mn of about at least 5000.

17. A composition according to claim 1, further including a metallic oxide at a concentration level of less than about 25 parts by weight per hundred parts of said sulfonated polymer.

18. A composition according to claim 17, wherein said metal oxide is zinc oxide.

19. A composition according to claim 1, further including a metallic hydroxide at about less than 5 parts by weight per hundred parts of said sulfonated polymer, a metal ion of said metallic hydroxide being selected from the group consisting of calcium, magnesium and barium.

20. A composition of claim 1, further including a lubricant.

21. A composition of claim 20, wherein said lubricant is a crystalline hydrocarbon wax having a melting point of about 135° F. to about 220° F. and an Mn of about 1000 to about 4000.

22. A composition according to claim 1, further including an amorphous polypropylene.

23. A composition according to claim 10, wherein said metallic salt is selected from the group consisting of zinc stearate, barium stearate, lead stearate, magnesium stearate, and sodium stearate.

* * * * *